United States Patent [19]

Iijima

[11] Patent Number: 5,097,192
[45] Date of Patent: Mar. 17, 1992

[54] CONTROLLER OF A SYNCHRONOUS MOTOR

[75] Inventor: Masahiko Iijima, Koriyama, Japan

[73] Assignee: Yamamoto Electric Corporation, Sukagawa, Japan

[21] Appl. No.: 681,603

[22] Filed: Apr. 8, 1991

[30] Foreign Application Priority Data

Jul. 9, 1990 [JP] Japan .................... 2-180774

[51] Int. Cl.⁵ .............................. H02F 5/28
[52] U.S. Cl. ...................... 318/712; 318/599; 318/811; 318/714
[58] Field of Search ............. 318/700, 254, 239, 599, 318/712, 721, 715, 714, 724, 793, 696, 810–811

[56] References Cited

U.S. PATENT DOCUMENTS

| | | | |
|---|---|---|---|
| 3,967,173 | 6/1976 | Stich | 318/811 |
| 4,322,671 | 3/1982 | Kawada et al. | 318/811 |
| 4,952,860 | 8/1990 | Soeda | 318/721 |
| 4,983,891 | 1/1991 | Sekimoto | 318/696 |
| 5,010,282 | 4/1991 | Moberg | 318/696 |

FOREIGN PATENT DOCUMENTS

62-114494 5/1987 Japan .
1-103190 4/1989 Japan .
1-303091 12/1989 Japan .

*Primary Examiner*—William M. Shoop, Jr.
*Assistant Examiner*—John W. Cabeca
*Attorney, Agent, or Firm*—Armstrong, Nikaido, Marmelstein, Kubovcik & Murray

[57] ABSTRACT

A controller of a synchronous motor for stably controlling the synchronous motor from a low speed to a high speed. The controller includes a multi-phase synchronous motor, a multi-phase square wave oscillator circuit, a magnetic pole position detection unit for detecting a position of the magnetic pole of a rotor of the multi-phase synchronous motor, and a unit for calculating a detection period of the magnetic pole position of the rotor by the magnetic pole position detection unit. The controller further includes a unit for dividing multi-phase square waves for each phase generated from the multi-phase square wave oscillator circuit into a plurality of pulses for each period to produce the divided square pulses. The controller also includes an excitation current control unit for controlling the divided square pulses for each phase in accordance with the detection period to supply the pulses to stator coils of the motor.

6 Claims, 4 Drawing Sheets

FIG. 4A OUTPUT CL OF OSCILLATOR 2

FIG. 4B OUTPUT OF THREE-PHASE SQUARE WAVE GENERATOR 4
a) U PHASE
b) V PHASE
c) W PHASE

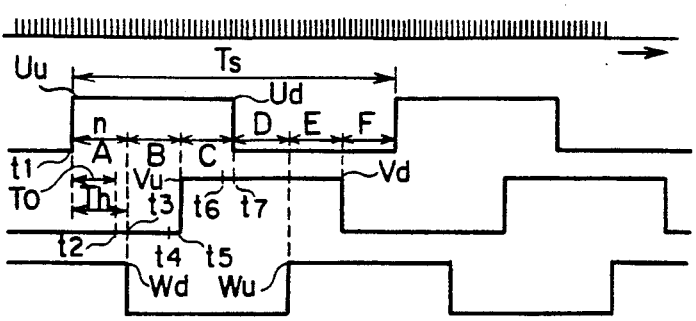

FIG. 4C OUTPUT OF HALL SIGNAL GENERATION CIRCUIT (HALL SQUARE SIGNAL) $N > N_s$
a) U PHASE
b) V PHASE
c) W PHASE

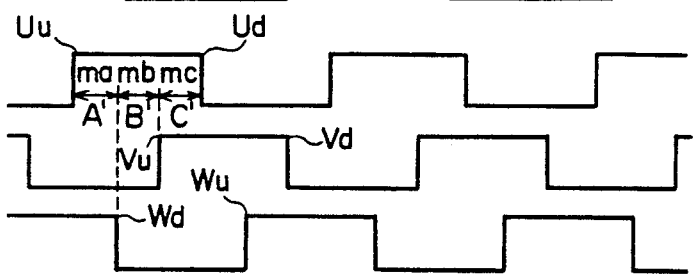

FIG. 4D OUTPUT OF HALL SIGNAL GENERATION CIRCUIT (HALL SQUARE SIGNAL) $N < N_s$
a) U PHASE
b) V PHASE
c) W PHASE

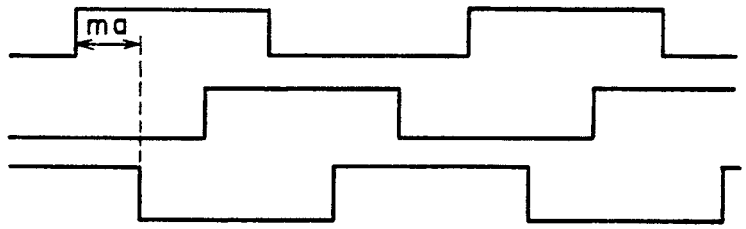

FIG. 4E OUTPUT SQUARE PULSE OF THREE-DIVIDED SIGNAL GENERATION CIRCUIT (THREE-DIVIDED SQUARE SIGNAL)
a) U PHASE
b) V PHASE
c) W PHASE

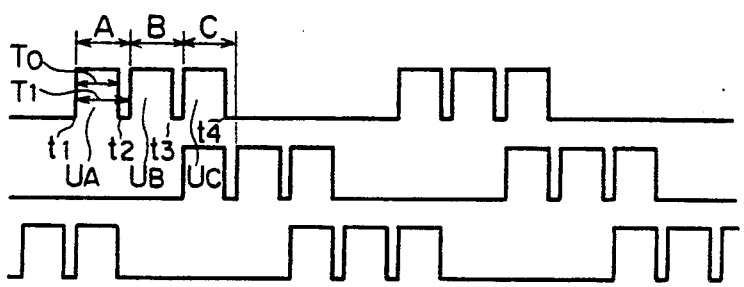

FIG. 4F EXCITATION SIGNAL U PHASE

FIG. 4G
a) U PHASE
b) V PHASE
c) W PHASE

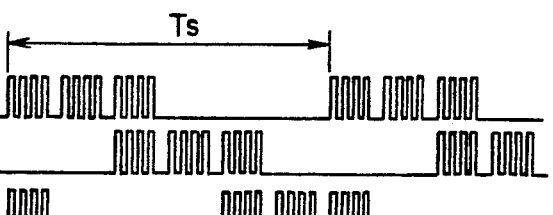

FIG. 4H
a) U PHASE
b) V PHASE
c) W PHASE

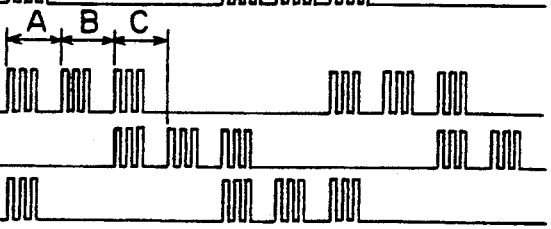

| U V W | PULSE OF U PHASE | SECTION OF U PHASE |
|---|---|---|
| 1 0 1 | UA | A |
| 1 0 0 | UB | B |
| 1 1 0 | UC | C |
| 0 1 0 | | D |
| 0 1 1 | | E |
| 0 0 1 | | F |

CONTROLLER OF A SYNCHRONOUS MOTOR

BACKGROUND OF THE INVENTION

The present invention relates to a controller of an electric motor, and more particularly to a controller of a synchronous motor suitable for control of stable rotation from a low speed to a high speed.

As a control method of a conventional synchronous motor, a control method described in, for example, Japanese Patent Application No. 62-259399, JP-A-62-114494 and JP-A-1-303091 is described with reference to FIG. 1. When a magnetic pole of a stator is excited in the case where an end (an opposite end in the rotation direction) of a magnetic pole of a rotor is at a position P, the rotor is moved in the direction of arrow and reaches a position R through a position Q. However, since the rotor is continuously excited even in the position R, a braking force acts on the rotor to prevent smooth rotation of the motor.

More particularly, a waveform of an excitation current, as shown by (A) of FIG. 2, is continuously supplied to the stator for some time even after the rotor has reached the position R starting from the position P. Accordingly, since the excitation time is long and a large current flows through the stator as the rotation of the electric motor is low, a consumption power is increased and the rotation of the electric motor is not smooth to be liable to produce vibration.

SUMMARY OF THE INVENTION

The inventors have proposed a so-called current save method in which the excitation current supplied to the stator is divided into an output waveform portion a generated while one end of the magnetic pole of the rotor is moved from the position P to Q, an output waveform portion b from the position Q to R and an output waveform portion c from the position R until the excitation current disappears, and the output waveform in the portion c is removed since it is a braking force to the electric motor and the output for waveform in the portion b is also removed since it is nor necessary when the inertia of the rotor by the driving force in the portion a is utilized, so that only the output waveform in the portion a is applied to the stator as shown by (B) of FIG. 2.

In this case, if the rotational number of the motor is increased and a time of movement from the position P to Q is short, a duration of the output waveform b is also short. Nevertheless, when the rotational number is decreased, an output is reduced to decrease the rotational number. Further, when a load is increased, a duration of the output waveform is lengthened to the maximum duration as shown by (A) of FIG. 2.

In the current save method, if a magnetic pole of the rotor made of rare-earth material having a large magnetic force is used or an excitation voltage is incresed in order to require large torque in a low speed, torque ripple is increased and vibration of the motor is large in a light load or no load. Further, when the rotational number exceeds the synchronous rotational number remarkably, the excitation output is reduced to zero and the rotational number is decreased until it falls within a synchronous rotation range. However, when it reaches the synchronous rotation range and the output is again supplied, vibration is produced and smooth rotation is prevented.

It is an object of the present invention to provide a controller of an electric motor which solves the problems in the prior art and controls rotation of the electric motor from a low speed to a high speed stably with less vibration.

According to an aspect of the present invention, a controller of a synchronous motor according to the present invention comprises a multi-phase synchronous motor, a multi-phase square wave oscillator circuit, a magnetic pole position detection unit for detecting a position of the magnetic pole of a rotor of the multi-phase synchronous motor, a unit for calculating a detection period of the magnetic pole position of the rotor by the magnetic pole position detection unit, a unit for dividing a multi-phase square wave for each phase generated from the multi-phase square wave oscillator circuit into a plurality of portions for each period to produce the divided square pulses, and an excitation current control unit for controlling the divided square pulses for each phase in accordance with the detection period to supply the pulses to stator coils of the motor.

In the present invention, each of the multi-phase square waves to the stator is divided into a plurality of portions for each period to produce the divided square pulses and a voltage value or a pulse duration of the divided square pulses is controlled in accordance with a difference between an actual rotational speed N of the rotor and the synchronous speed NS. More particularly, when N>NS, the voltage value or the pulse duration of the divided square pulses for each phase is reduced. Preferably, a time required to rotate the rotor by a phase angle corresponding to a rotational phase angle by the divided square pulses for each phase is counted to control the corresponding divided square pulse of the corresponding phase in accordance with the counted time.

Accordingly, since the motor is started in accordance with a starting characteristic of a brushless motor and is automatically switched to synchronous operation when reaching a synchronous speed, stable driving operation can be attained even for variation of a load.

BRIEF DESCRIPTION OF THE DRAWINGS

FIGS. 4A to 4H show waveforms of signals at portions of the controller of FIG. 3;

DESCRIPTION OF THE PREFERRED EMBODIMENT

Figure 3:
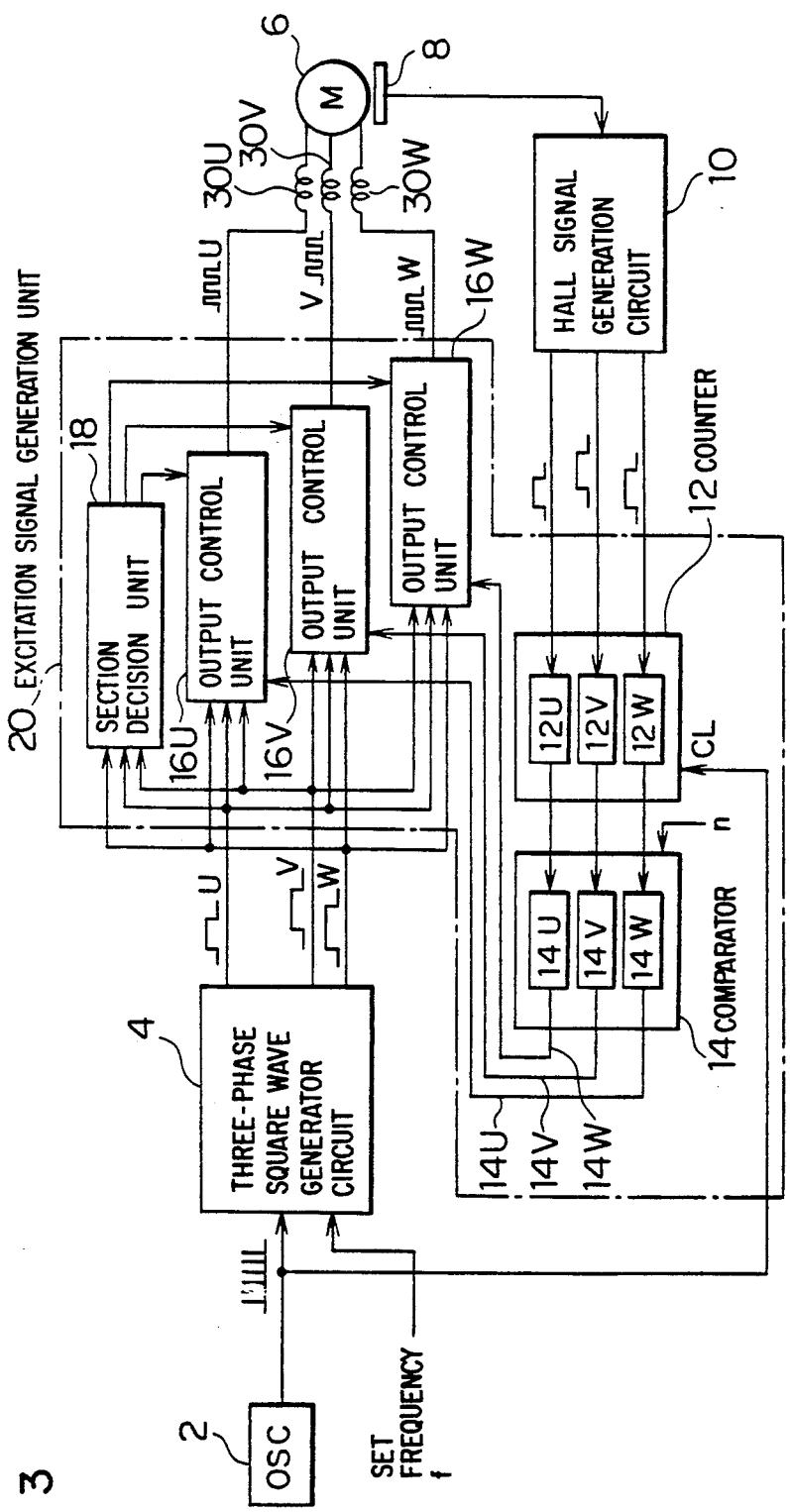
FIG. 3 is a diagram schematically illustrating a typical embodiment of a controller of an electric motor according the present invention.

FIG. 3 is a block diagram showing a typical example of a controller of a synchronous motor according to the present invention. FIGS. 4A to 4H are timing charts showing waveforms of signals at portions of FIG. 3.

In FIG. 3, numeral 6 denotes a multi-phase synchronous motor which is a three-phase synchronous motor in the embodiment but is not limited thereto in the present invention and may be a two-phase or four-phase synchronous motor, for example. Numeral 2 denotes a high-frequency oscillator circuit which generates a clock signal CL (FIG. 4A) having an oscillation frequency of, for example, 4 MHz which is supplied to a three-phase square wave generator circuit 4. The three-phase square wave generator circuit 4 is previously applied with an output set frequency f based on the following equation.

$$Ns = (120 \cdot f/P) \cdot (1-S)$$

where Ns is a synchronous rotation number of the motor (rpm), f is a frequency (Hz), P is the number of poles, and S is a slip.

Accordingly, the circuit 4 frequency-divides the clock CL and generates three-phase square waves having a frequency f as shown in FIG. 4B.

Disposed in the vicinity of the rotor of the motor 6 are detectors 8 such as, for example, hall sensors for detecting a position of a magnetic pole of the rotor. The number of hall sensors is, for example, three and the sensors are disposed at the periphery of the rotor at intervals of 30 degrees. In the drawing, only one hall sensor 8 is shown for simplification of the drawings. Output signals of the hall sensors 8 are supplied to a hall signal generation circuit 10 which produces hall square signals (corresponding to the square wave signals produced from the three-phase square wave generator 4) of three-phase square waves shown in FIG. 4C or 4D which are supplied to a counter 12. The counter 12 counts the clock signals CL between a rising edge and a falling edge of each of the hall square signals and supplies its resultant counts ma to mc to a comparator 14. The comparator 14 compares the counts ma to mc for the hall square signals for each phase with a predetermined set value n and supplies signal 14U, 14V and 14W indicating its comparison results to output control units 16U to 16W. The output control units 16U to 16W divide the three-phase square waves for the respective corresponding phases into three blocks, respectively, and control the blocks on the basis of the corresponding comparison results to supply drive signals (FIG. 4E) to excitation coils 30U to 30W corresponding to the stator.

The counter 12, the comparator 14, the output control units 16U to 16W and a section decision unit 18 constitute an excitation signal generation unit and its operation is now described. The counter 12 includes counter circuits 12U, 12V and 12W which handle the hall square signals for U, V and W phases, respectively. The counter circuit 12U counts times of three divided portions A', B' and C' of the corresponding hall square signal (refer to a) of FIG. 4C). The counter circuit 12U is reset to zero in response to a rising edge Uu of the hall square signal of the U phase (FIG. 4C) and then begins to count the clock signals CL until a falling edge Wd of the hall square signal of the W phase so that its count ma is supplied as a time of the portion A' to the comparator 14. At the same time, the counter circuit 12U is reset by the falling edge Wd of the hall square signal of the W phase and then counts the clock signals CL until a rising edge Vu of the hall square signal of the V phase to produce its counts mb as a time of the portion B'. Similarly, the counter circuit 12U counts the clock signal CL from the rising edge Vu of the V phase to a falling edge Ud of the U phase to produce its count mc as a time of the portion C'. The counter circuit 12U successively produces the counts ma to mc similarly. Further, the counter circuits 12V and 12W also count the clock and produce times ma to mc for the portions with respect to the V and W phases similarly.

The set value n supplied to the comparator 14 is a value representing any one time for the three-divided portions a, b and c of the square wave (FIG. 4B) produced from the three-phase square wave generator circuit 4 and is, for example, a count of the clock signal CL between the rising edge Uu of the U phase to the falling edge Wd of the W phase. The comparator 14 includes comparator circuits 14U, 14V and 14W which compare the counts ma, mb and mc of the counter circuits 12U, 12V and 12W with the set value n, respectively, and supply comparison results 14U, 14V and 14W for the U, V and W phases, respectively, to the output control units 16U to 16W, respectively.

Figure 5:
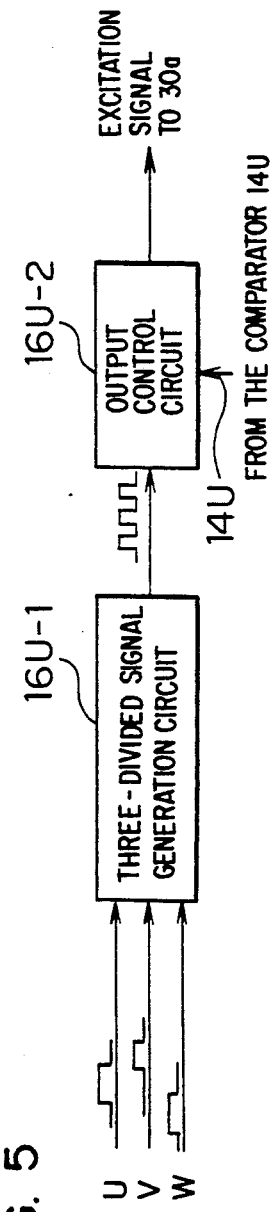
FIG. 5 is a diagram showing an example of an output control unit of FIG. 3.

Each of the output control units 16U to 16W includes a three-divided signal generation circuit and an output control circuit. FIG. 5 shows only a configuration of the output control unit 16U but the output control units 16V and 16W are also configured similarly.

In FIG. 5, the three-divided signal generator circuit 16U-1 generates a first square pulse UA finished just before a time of period A (a) of FIG. 4E ) from the rising edge Uu of the U phase (a) of FIG. 4B ) to the falling edge Wd of the W phase of the square signal produced by the three-phase square wave generation circuit 4, a second square pulse UB finished just before a time of period B from the falling edge Wd to the rising edge Ud of the U phase and a third square pulse UC finished just before a time of period C from the rising edge Vu to the falling edge Ud of the U phase. The square pulses UA to UC generated above are successively supplied to the output control circuits 16U-2. Operation of the output control circuit 16U-2 is described with reference to a flow chart of FIG. 6.

Figures 6, 7:
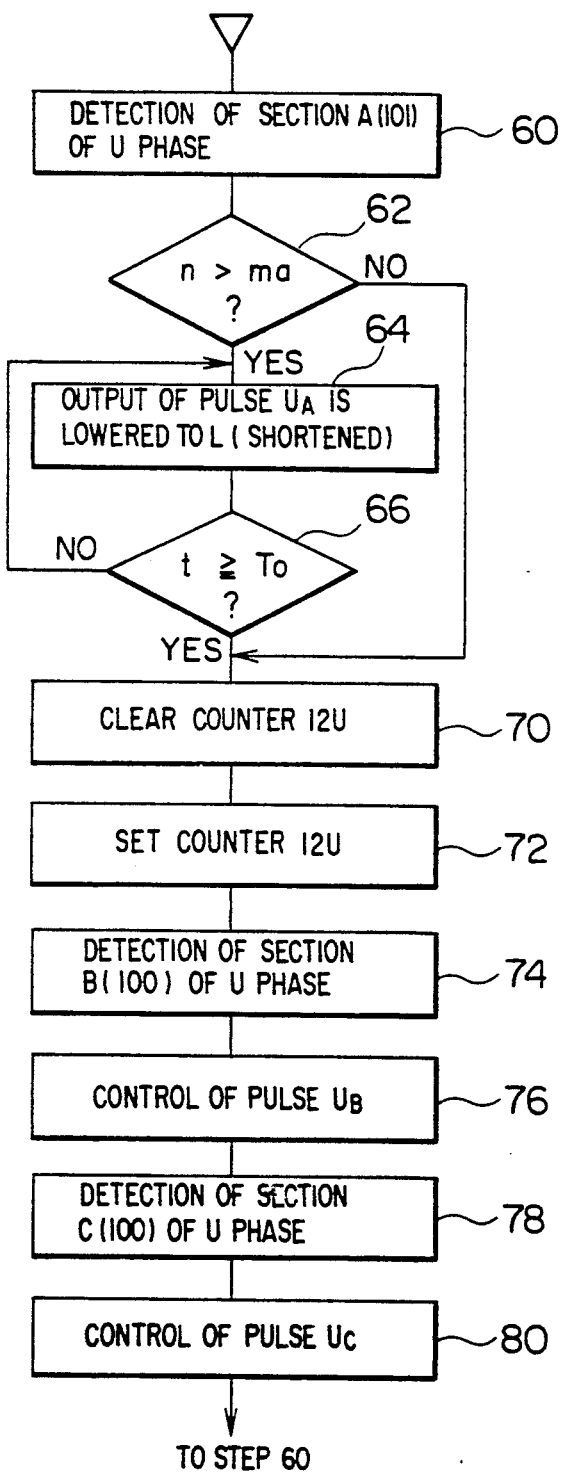
FIG. 6 a flow chart explaining operation of the output control unit of FIG. 3.
FIG. 7 a diagram explaining operation of a section decision unit of FIG. 3.

First of all, in step 60, decision is made on the basis of the output of the section decision unit 18 as to which section of sections A to E the square wave of the U phase (a) of FIG. 4B) produced from the three-phase square wave generation circuit 4 exists in. The section decision unit 18 decides the section of the U phase in accordance with signal levels of the U, V and W phases as shown in FIG. 7. More particularly, if the signal levels of the U, V and W phases are, for example, (high), 0 (low) and 1 (high), the section of the U phase is A and the output square pulse of the three-divided signal generation circuit 16U-1 is decided to be UA. If the signal levels of the U, V and W phases are (1,0,0) or (1,1,0), the section B or C is decided, and if (0,1,0), (0,1,1) or (0,0,1), the section D, E or F is decided. Similarly, decision is also made for the V and W phases and the decision results is applied to the output control circuits 16U-2, 16V-2 and 16W-2. Accordingly, when it is detected that the section of the U phase is A in step 60, whether n is larger than ma (n>ma) or not is checked on the basis of the comparison result of the comparator circuit 14U for the count ma (step 62). If n≦ma (the rotational number N is equal to or smaller than the synchronous speed Ns) (FIG. 4D), the process proceeds to step 70 and the square pulse UA from the three-divided signal generation circuit is supplied to the stator coil 30U and it is. On the other hand, if n>ma (n>Ns), the process proceeds to step 64 in which an output voltage of the square pulse UA is lowered by a predetermined value and is produced. The duration To (pulse width) of the square pulse UA may be shortened by a predetermined value or a time of falling edge may be advanced (FIG. 4F)

instead of lowering the voltage. Then, whether an elapsed time t from a rising time t of the square pulse reaches a predetermined time To (pulse width of the three-divided square signal UA) or not is checked (step 66). If not, the process is returned to step 64, while if so the process proceeds to step 70 in which the counter 12U is cleared. When the elapsed time t reaches time T1 of the section A, the counter 12U is set (step 72) and counts the clock signals CL again. In this manner, output voltage (or duration) of the square pulse UA is controlled in accordance with the count ma. The elapsed time t may be measured by counting the clock signals CL.

Then, when the section B of the U phase of the three-phase square wave is detected (step 74), the square pulse UB is controlled on the basis of comparison result of the comparator circuit 14U for the count mb in the same manner as steps 62 to 72. The square pulse UC of the U phase is controlled in the same manner (steps 78 and 80). The square pulse is not produced for the sections D, E and F of the three-phase square wave of the U phase.

Accordingly, when a next square pulse UA of the three-phase square wave of the U phase is applied, the process is executed from step 60 again.

The same control is performed for the V and W phases by the output control units 16V and 16W, respectively.

Accordingly, since n≦ma, mb and mc upon starting, the three-divided square pulses UA, UB and UC are produced as they are and the output control circuits 6U-2, 16V-2 and 16W-2 produce the square pulses as they are until the speed reaches the synchronous speed. When N>Ns due to variation of a load after reaching the synchronous speed, the output voltage of the square pulse is controlled to be low (or the pulse width is shortened). Thus, the motor is automatically controlled stably for variation of the load without need of switching the excitation signal to the stator from the starting to the synchronous operation.

Figure 1:
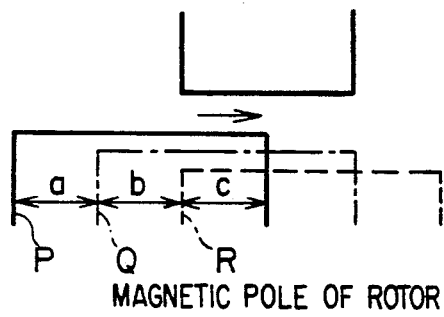
FIG. 1 schematically illustrates an operation principle of a conventional synchronous motor.
Figure 2:
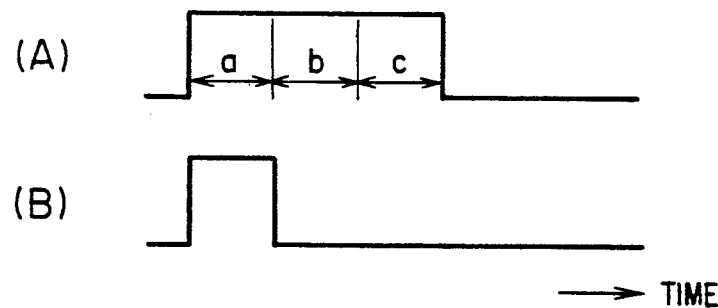
FIG. 2 shows waveforms of excitation currents supplied to a stator of a synchronous motor.

In the embodiment, since the three-phase square wave is divided into three square pulses and the control operation is made on the basis of the comparison result for each square pulse, resolution of control is enhanced and since the excitation signal to the stator approaches a sine wave as compared with the control by one square pulse as shown by (B) of FIG. 2, rotation can be made smoothly with less vibration, specifically in a low speed.

The three square pulses are classified so that the pulse for the section A serves to rotate the motor, the pulse for the section B serves to stop the rotor immediately and the pulse to the section C serves to suppress over-rotation of the rotor. The pulses for each of the sections can be controlled to stabilize the rotation of the motor. Accordingly, the stability of rotation can be improved as compared with the prior art and deviation of synchronization to the high speed side can be prevented.

In the embodiment, the voltage or the pulse width of the square pulse is controlled, while PWM control may be made as shown in FIGS. 4G and 4H and the PWM controlled signal may be supplied to the stator as an excitation signal. More particularly, pulse signals having the same period Ts as the phases of the three-phase square waves may be produced and duty ratios of the divided portions A, B and C for each of the phases may be controlled in accordance with corresponding comparison results from the comparator 14.

Preferably, a value of PWM is calculated by P control and the duty ratio of the divided portions A, B and C in the synchronization state is 50% or more because of current saving. Thus, deviation from the synchronous rotational number (specifically at high speed side) is reduced to the utmost and vibration producing at re-entry into the synchronous operation is mitigated.

In the embodiment, the counter 12 includes three counter circuits, while the same function may be attained by one or two counter circuits.

In the embodiment, ma, mb and mc are detected for the phases to control the square pulses for the corresponding phase, while a count for at least one phase may be detected and the detected values ma to mc may be used to control the square pulses for all phases.

Further, times for the three-divided sections A', B' and C' of the hall square signal are counted as counts ma, mb and mc, while the period of the hall square signal may be counted to control the three-divided square pulses correspondingly.

In the embodiment, one square wave is divided into three portions, while it may be divided into two or more portions. Further, the three-divided square pulses UA, UB and UC are controlled in accordance with the corresponding counts ma, mb and mc, while the pulses may be controlled by any one of the counts ma, mb and mc.

In addition, the present invention can be applied to any of a commutator motor or a brushless motor and may be applied to the synchronous motor having the phase number other than the three phases.

The circuit configurations shown in FIGS. 3 and 5 are an example and a modified circuit configuration having the similar function may be used.

We claim:

1. A controller of a synchronous motor comprising:
   a multi-phase synchronous motor;
   a multi-phase square wave oscillator circuit;
   means for detecting a position of a magnetic pole of a rotor of said multi-phase synchronous motor;
   means for calculating a period of the detection of the position of the magnetic pole of the rotor by said magnetic pole position detection means;
   means for dividing a width of each square pulse of a multi-phase square wave, for each phase generated by said multi-phase square wave oscillator circuit, into a plurality of portions for each period to produce pulse width divided square pulses; and
   excitation current control means for controlling said divided square pulses for each phase in accordance with said detection period to supply the pulses to stator coils of said motor.

2. A controller of a synchronous motor according to claim 1, wherein said excitation current control means comprises means for comparing said detection period with a predetermined period and a control unit for controlling the divided square pulses for each phase in accordance with the comparison result, said control unit including means for reducing an effective value of the divided square pulse for each phase when said comparison means decides that said detection period is shorter than said predetermined period.

3. A controller of a synchronous motor according to claim 1, wherein said control means includes means for reducing a voltage value of the divided square pulse for each phase when said detection means decides that said detection period is shorter than a predetermined period.

4. A controller of a synchronous motor according to claim 2, wherein said control means includes means for reducing a pulse width of the divided square pulse for each phase when said detection means decides that said detection period is shorter than said predetermined period.

5. A controller of a synchronous motor according to claim 1, wherein said detection period calculation means includes means for counting a time required to rotate the rotor by a phase angle corresponding to a rotation phase angle by the divided square pulses for each phase, and said excitation current control means includes means for controlling the corresponding divided square pulse of the corresponding phase in accordance with the counted time.

6. A controller of a synchronous motor according to claim 1, wherein said divided square pulse producing means includes means for producing a PWM controlled signal as the divided square pulse.

* * * * *